US012173517B1

(12) United States Patent
Farish et al.

(10) Patent No.: US 12,173,517 B1
(45) Date of Patent: Dec. 24, 2024

(54) ADJUSTABLE DOOR SUPPORT AND METHODS OF USE

(71) Applicant: Masonite Corporation, Tampa, FL (US)

(72) Inventors: Steven Farish, Charlotte, NC (US); Cory J. Sorice, La Grange, IL (US); Robert C. Allen, Elburn, IL (US); Poormehr Honarmand, Wellesley, MA (US); Lukasz Dabros, Carol Stream, IL (US)

(73) Assignee: MASONITE CORPORATION, Tampa, FL (US)

( * ) Notice: Subject to any disclaimer, the term of this patent is extended or adjusted under 35 U.S.C. 154(b) by 339 days.

(21) Appl. No.: 17/699,336

(22) Filed: Mar. 21, 2022

Related U.S. Application Data

(60) Provisional application No. 63/163,331, filed on Mar. 19, 2021.

(51) Int. Cl.
*B66F 15/00* (2006.01)
*E04F 21/00* (2006.01)

(52) U.S. Cl.
CPC .......... *E04F 21/0023* (2013.01); *B66F 15/00* (2013.01); *B66F 2700/09* (2013.01)

(58) Field of Classification Search
CPC ........ B66F 15/00; B66F 2700/09; B66F 3/22; B66F 19/00
See application file for complete search history.

(56) References Cited

U.S. PATENT DOCUMENTS

| | | | | |
|---|---|---|---|---|
| 1,446,309 | A | 2/1923 | Krohne | |
| 1,715,722 | A | 6/1929 | Smith et al. | |
| 2,621,687 | A | 12/1952 | Fordon | |
| 3,871,054 | A | 3/1975 | Schaefer | |
| 4,010,931 | A * | 3/1977 | Wheeler | B66F 15/00 254/131 |
| 4,168,827 | A | 9/1979 | Hutchinson | |
| 4,270,741 | A | 6/1981 | Hurst | |
| 4,492,369 | A * | 1/1985 | Pohl | B66F 15/00 269/60 |
| 5,927,731 | A | 7/1999 | Clarke | |
| 6,024,351 | A | 2/2000 | Metoyer | |
| 6,505,844 | B2 | 1/2003 | Hallman et al. | |
| 6,640,867 | B1 * | 11/2003 | Pallotta | E06B 9/266 160/84.05 |
| 6,886,821 | B2 | 5/2005 | Eberle, III | |

(Continued)

*Primary Examiner* — Tyrone V Hall, Jr.
(74) *Attorney, Agent, or Firm* — CANTOR COLBURN LLP

(57) ABSTRACT

An adjustable door support for acquiring a door gap and supporting a door slab at a height off a floor equal to the door gap. The adjustable door support comprises a bendable sheet including two outer and two inner sections, and two tie devices. The two inner sections are disposed at an oblique angle relative to one another and form a support slot for receiving a portion of the door slab therein. The support slot has door support edges for engaging the door slab. Each of the tie devices includes a cable tie threaded through the inner sections of the bendable sheet and a locking washer attached to the cable tie by sliding over the cable ties in one direction only. The locking washers are lockable on the cable ties to adjust a distance between the support edges of the adjustable door support and the floor.

3 Claims, 6 Drawing Sheets

(56) References Cited

U.S. PATENT DOCUMENTS

| | | | | |
|---|---|---|---|---|
| 8,220,780 | B2 * | 7/2012 | Guillore .................. | B66F 15/00<br>254/131 |
| 8,757,604 | B2 | 6/2014 | Crampton | |
| 9,586,309 | B1 | 3/2017 | Poulos et al. | |
| 10,005,173 | B2 | 6/2018 | Furey | |
| 2002/0125625 | A1 | 9/2002 | Klippel | |
| 2015/0020461 | A1 | 1/2015 | Galvez | |
| 2019/0284822 | A1 | 9/2019 | Hayes | |

* cited by examiner

ADJUSTABLE DOOR SUPPORT AND METHODS OF USE

CROSS-REFERENCE TO RELATED APPLICATION AND CLAIM TO PRIORITY

This application claims the benefit of U.S. Provisional Patent Applications Ser. No. 63/163,331 filed Mar. 19, 2021 by Farish et al., which is hereby incorporated herein by reference in its entirety and to which priority is claimed.

BACKGROUND OF THE INVENTION

1. Field of the Invention

The present invention is related to door slab mounting tools, and more specifically to an adjustable door support and method of use that allows a user to determine the distance between a bottom edge of an existing door slab mounted to a door frame and a floor, and to support a replacement door slab at the height above the floor (door gap) as the existing door slab to facilitate installation of the replacement door slab to the door frame.

2. Description of the Related Art

Existing exterior or interior doors are found everywhere for opening and closing access between two rooms or zones. Occasionally a door slab or doors slabs may need to be replaced and installed in the frame that previously held the door being replaced.

Currently it is quite difficult to replace a door and is a job that one of average DIY skills may not have the confidence to tackle. Currently there are essentially two options: one being to use a "pre-hung" door unit (i.e., including of a pre-hinged door slab that is already fastened to a prebuilt door frame), and the other option being replacing the door by a professional installer while leaving the door frame in place. These difficulties may limit the willingness of homeowners to replace their existing doors.

Replacing the door slab with the pre-hung door requires the installer to remove the entire existing (or old) door slab and frame from an opening in a wall, and re-install a replacement door slab and frame into the opening. This requires a higher level of DYI skill and knowledge. It can take a considerable amount of time and effort if one is not skilled in the procedure. Further, there is no genuine need for a replacement frame, so costs are needlessly increased.

Installing the replacement door slab presents its own unique challenges and is generally more difficult than installing a pre-hung door system, especially for one with no prior experience. For example, during the installation the installer typically needs to lift the replacement door slab into place, which can be awkward and difficult without two people, and then fasten the door to the frame. Moreover, the replacement door slab needs to be placed and supported at the same door gap as the existing door slab to facilitate installation of the replacement door slab to the door frame. Further, aid in balancing of the replacement door slab and alignment of hinges is needed if the replacement door is to swing as did the original door. Typical supports are cumbersome and require many adjustments.

Therefore, the need exists for an adjustable door support for supporting and holding the replacement door slab at a predetermined distance from a floor in assisting with accurately securing a replacement door slab to a door frame.

BRIEF SUMMARY OF THE INVENTION

According to a first aspect of the present invention, there is provided a system for installing a door slab in a door frame. The door slab is adapted to be pivotally mounted to the door frame by door hinges. The system comprises an adaptable door mounting support configured to acquire a door gap, defined as a distance between a bottom edge of the door slab pivotally mounted to the door frame through the door hinges and the ground/floor and to support the replacement door slab at a height off the ground equal to the door gap. The door mounting support includes a frame member and at least one tie device. The at least one tie device meters the door gap and holds the door slab in place at the height off the ground equal to the door gap. The frame member includes first and second A-shaped segments According to a first aspect of the present invention, there is provided a system for installing

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
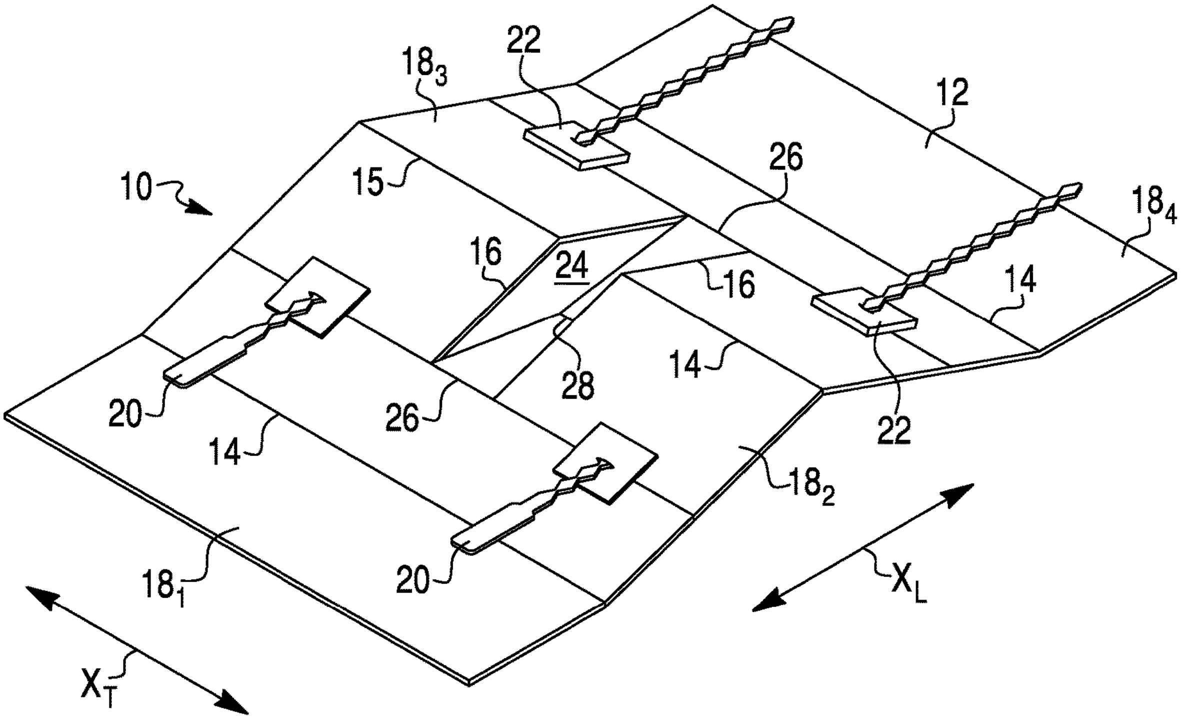
FIG. 1 is a perspective view of an adjustable door support according to a first exemplary embodiment of the present invention in a folded state.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal,"

"vertical," "front," "rear," "upper", "lower", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
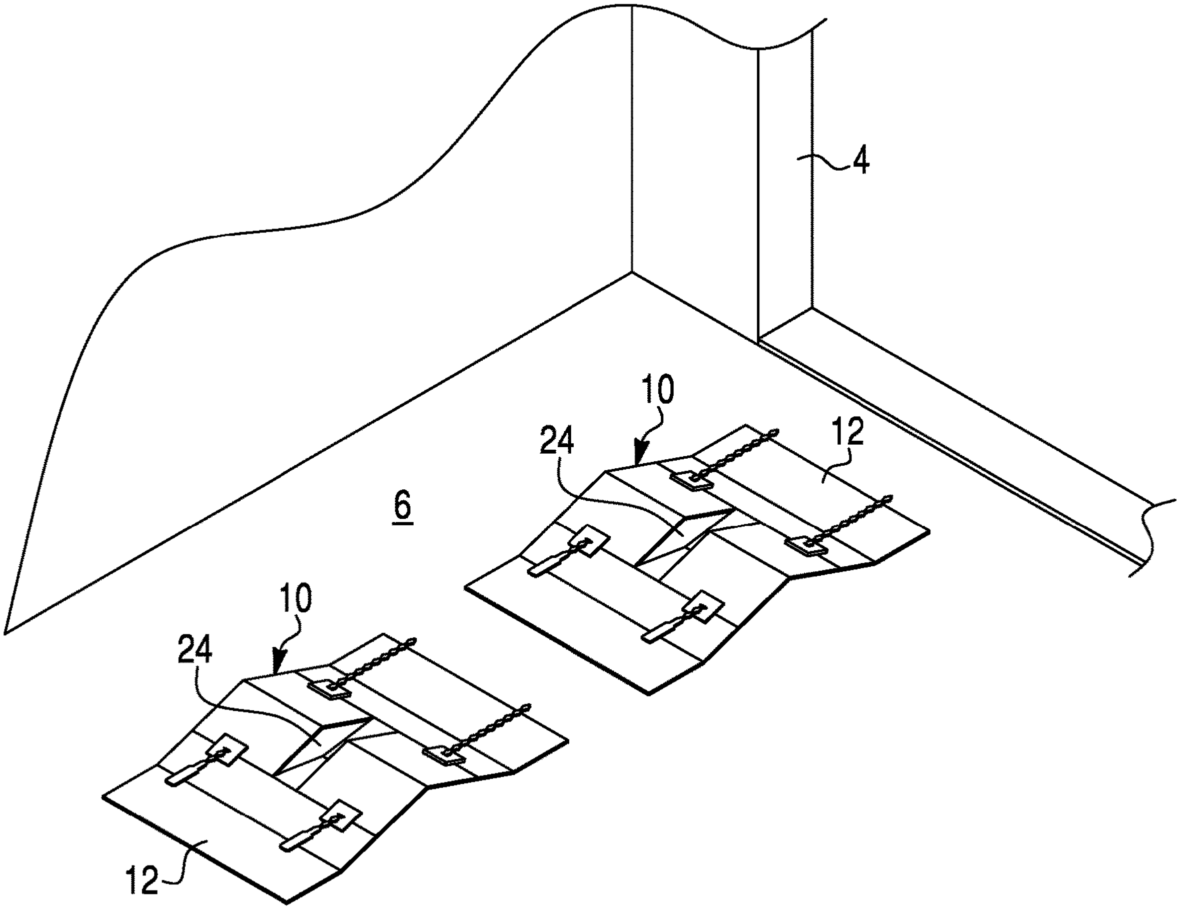
FIG. 2 is a perspective view of two adjustable door supports according to the first exemplary embodiment in the folded state placed on a floor in line relative to one another and ready to support a door slab.
Figure 3:
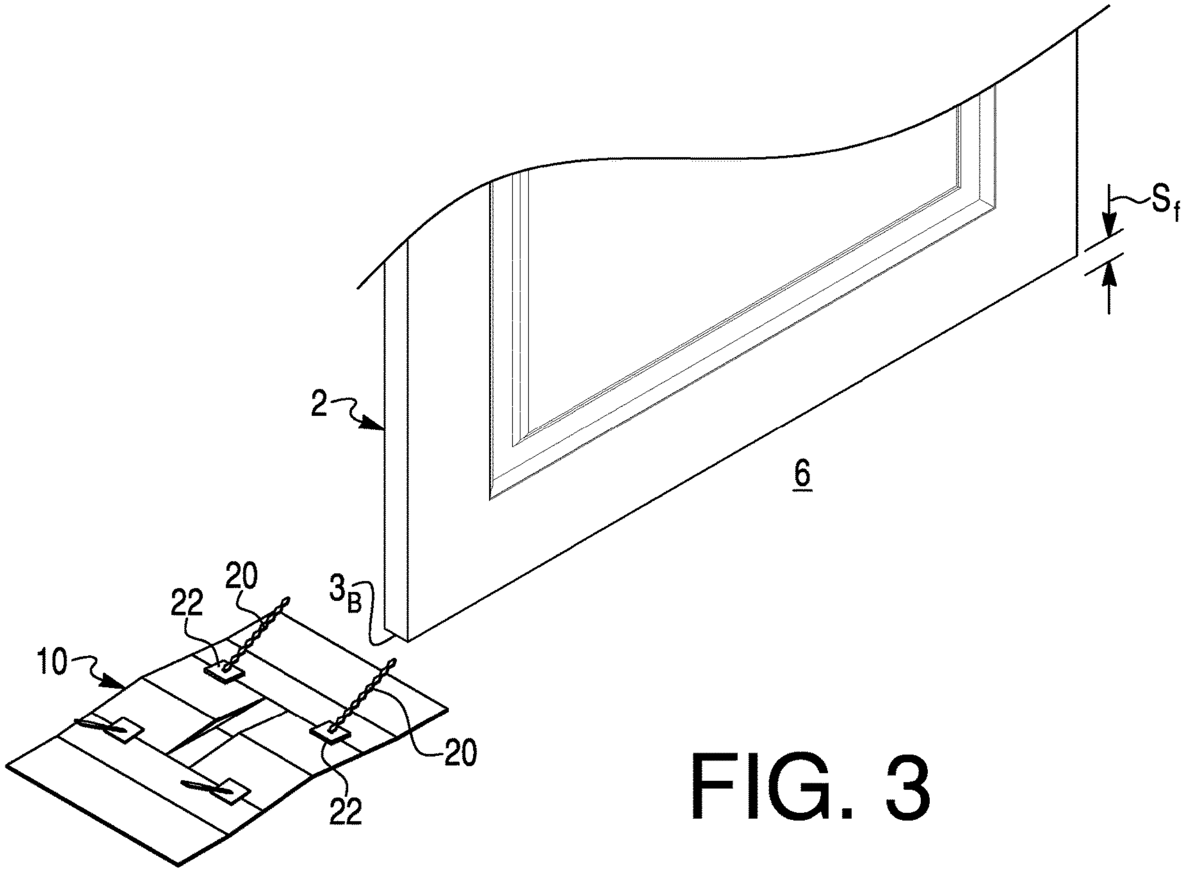
FIG. 3 is a perspective view of the adjustable door support according to the first exemplary embodiment in a pre-shaped but flat state placed on the floor next to the door slab.
Figure 4:
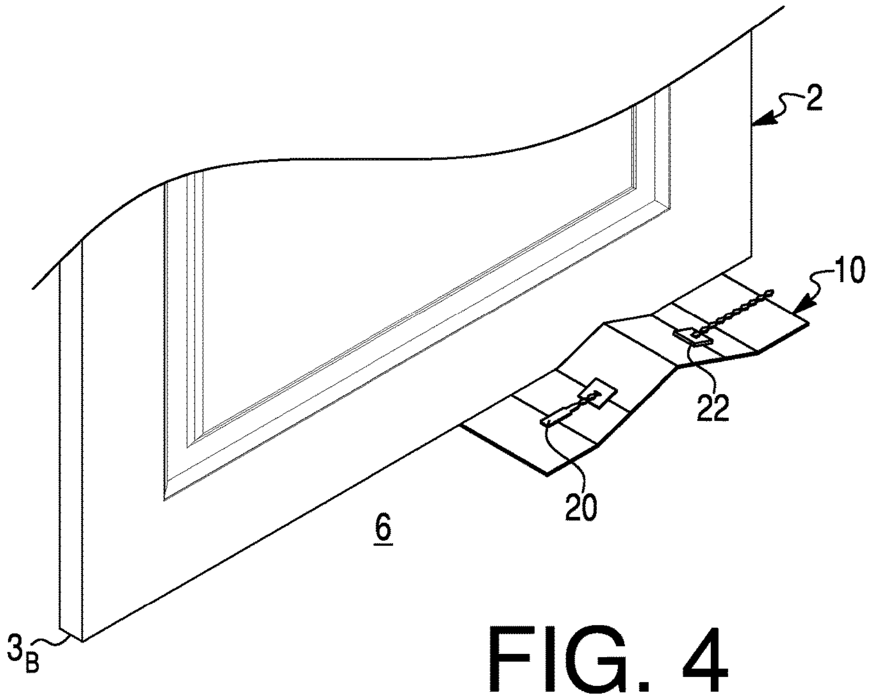
FIG. 4 is a perspective view of the adjustable door support according to the first exemplary embodiment in folded state positioned below the door slab.
Figure 5:
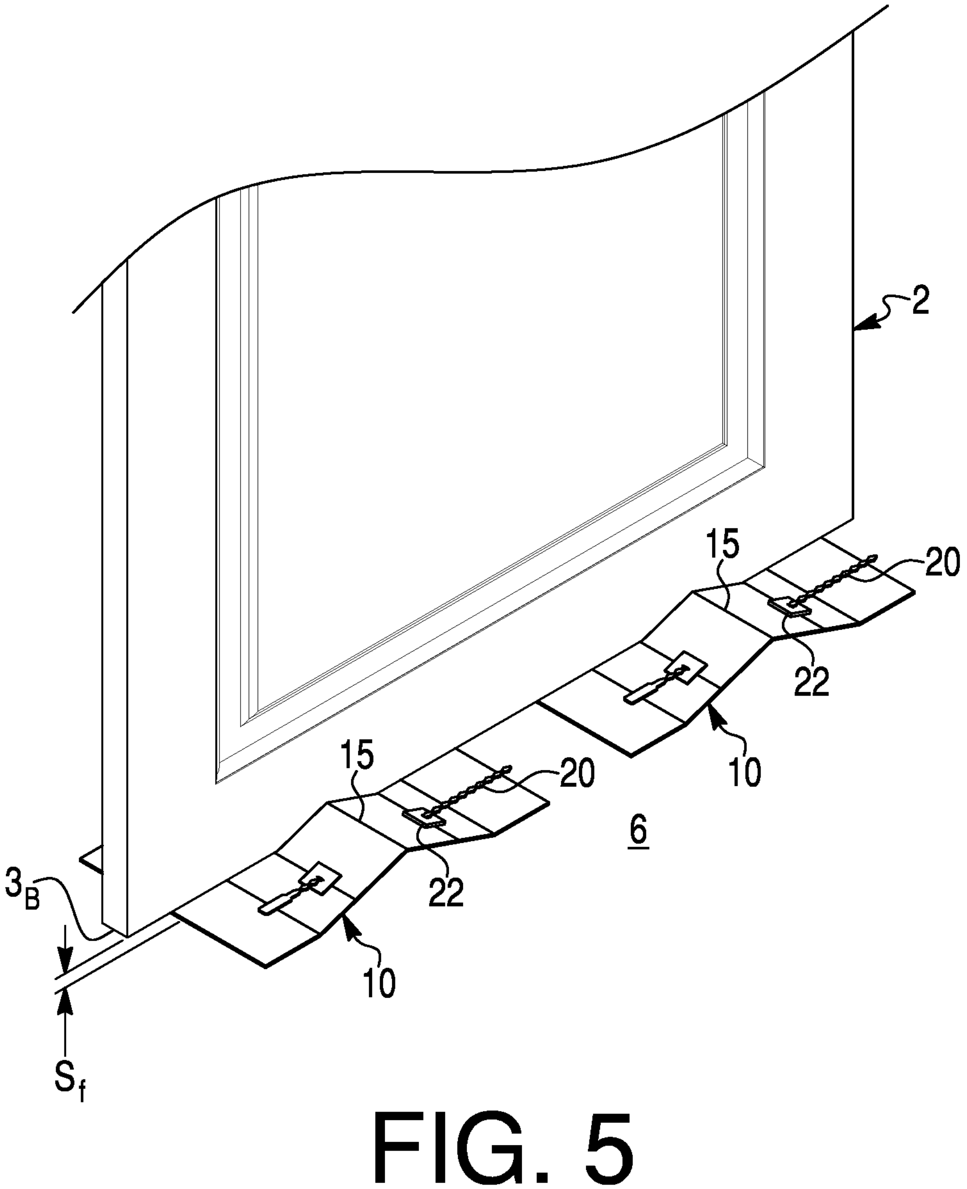
FIG. 5 is a perspective view of two adjustable door supports according to the first exemplary embodiment in the assembled state supporting the door slab on the floor.

FIG. 1 depicts an adjustable door support 10 according to a first exemplary embodiment of the present invention. The adjustable door support 10 is configured to acquire a distance (or door gap) Sf between a bottom edge $3_B$ of a door slab 2 (such as an existing door slab) mounted to a door frame 4 and a floor (or ground) 6, as shown in FIGS. 2, 3 and 5. Door support 10 supports the door slab 2 (such as a replacement door slab), as shown in FIG. 4, at the same distance Sf from the floor 6 as the existing door slab to facilitate installation of the replacement door slab to the door frame 4.

The adjustable door support 10 is made of a flat rectangular sheet 12 of bendable material, such as a corrugated cardboard. The rectangular sheet 12 has a plurality of (such as three, as shown in FIG. 1) transverse, parallel pre-scored lines 14 extending across the entire width of the sheet 12 in a transverse direction $X_T$. Two longitudinal parallel cut lines 16 extend across a portion of the length of the sheet 12 in a longitudinal direction XL. The distance between the longitudinal parallel cut lines 16 in the transverse direction is slightly larger than a thickness of the door slab 2. It will be appreciated that the door support 10 may be made of other bendable materials, such as corrugated plastic.

As best shown in FIG. 1, the three transverse pre-scored lines 14 divide the flat rectangular sheet 12 into four rectangular sections: two outer rectangular sections $\mathbf{18}_1$ and $\mathbf{18}_4$, and two inner rectangular sections $\mathbf{18}_2$ and $\mathbf{18}_3$. The two outer rectangular sections $\mathbf{18}_1$, $\mathbf{18}_4$ are spaced from one another by the two inner rectangular sections $\mathbf{18}_2$, $\mathbf{18}_3$ directly connected to one another. Moreover, each of the inner rectangular sections $\mathbf{18}_2$ and $\mathbf{18}_3$ has two holes extending therethrough. The door support 10 further includes two cable ties (or zip ties) 20, each threaded (i.e., passed through) through one of the holes in the inner rectangular sections $\mathbf{18}_2$ and $\mathbf{18}_3$. Once each of the cable ties 20 extends completely through the associated holes in the sheet 12, adjustable locking washers (or mocking tabs) 22 are attached to the cable ties 20 by sliding over free distal ends of the cable ties 20 to lock the cable ties 20 in place. It will be appreciated that the adjustable locking washers 22 are slidable over the cable ties 20 only in one direction, specifically from the free distal ends of the cable ties 20 toward heads thereof. Each of the cable ties 20 with the corresponding locking washer 22 defines a tie device.

The flat rectangular sheet 12 of the door support 10 is a corrugated structure that may be supplied as part of an outer packaging (outer box) of the replacement door slab 2. Preferably, the outer box of the door slab 2 includes two flat rectangular sheets 12. The door support 10 is perforated along an outer perimeter thereof and can be removed from the outer box of the door slab once an installer is ready for the installation process. The installer removes each flat rectangular sheet 12 by tearing along the perforation, folding according to instructions, and adjusting using the zip ties and locking washers. Alternatively, the flat rectangular sheets 12 may be included as a separate piece in the box. The door support 10 is used to support the door slab 2 being handled at a height to facilitate installation. In other words, the flat rectangular sheet 12 of the door support 10 is integrated into the outer box and eliminates the need for an additional support item. The door support 10 allows for quick acquisition of the door gap Sf achieves the secondary purpose of balancing the new or replacement door for easier installation.

In operation, the first step is removing the two flat rectangular sheets 12 of the two door supports 10 from the outer box of the door slab 2. The installer carefully removes supports 10 by tearing along the perforations. Next, each of the flat rectangular sheets 12 is pre-shaped (or pre-deformed) along the transverse pre-scored lines 14 according to the included instructions to achieve an inverted "V" shaped structure. Each of the flat rectangular sheets 12 is pre-folded along the transverse pre-scored lines 14 so that the inner rectangular sections $\mathbf{18}_2$ and $\mathbf{18}_3$ are folded relative to one another at an oblique angle and form a central top ridge 15. Each sheet 12 has two parallel cut lines 16 therethrough extending transverse to score lines 14, and located along the inner rectangular sections $\mathbf{18}_2$, $\mathbf{18}_3$. Next, the central top ridge 15 between the longitudinal cut lines 16 is pushed down from the central top ridge 15 along the cut lines 16 so as to form a support slot 24 defined by the inner rectangular sections $\mathbf{18}_2$, $\mathbf{18}_3$, two longitudinally opposite door support edges 26 and a support ridge 28. As illustrated in FIG. 1, the door support edges 26 are formed on the inner rectangular sections $\mathbf{18}_2$, $\mathbf{18}_3$ between the longitudinal parallel cut lines 16.

Then, the two supplied cable ties 20 are passed through the holes in the inner rectangular sections $\mathbf{18}_2$ and $\mathbf{18}_3$ of the pre-shaped but substantially flat sheet 12. Once each of the cable ties 20 is positioned completely through the associated, aligned holes in sheet 12, the adjustable locking washers 22 (or other zip ties) are passed over the free distal ends of the cable ties 20 to lock the cable ties 20 in place. Thus, two pre-shaped rectangular sheets 12 are formed.

Next, in order to acquire the dimension Sf, the installer positions the pre-shaped but substantially flat door support 10 under an end portion of the door slab 2 hung on the door frame 4 so that the outer rectangular sections $\mathbf{18}_1$, $\mathbf{18}_4$ are laying on the floor 6 and a portion of the bottom edge $3_B$ of the door slab 2 is disposed in the support slot 24 of the door support 10. After that, the support edges 26 of the door support 10 are raised to touch (or engage) the bottom edge $3_B$ of the door slab 2 and the support ridge 28 is lowered to touch the floor 6 by tightening (or pulling on) the cable ties 20 with the locking washers 22 to lock the door support 10 and provide strength. Once the support edges 26 of the door support 10 reach the height of the door gap Sf, the door support 10 is locked into shape and place by pulling on the cable ties 20 while using the locking washers 22 to lock the door support 10 in a folded state, as shown in FIG. 4. Thus, the distance between the support edges 26 of the door support 10 and the floor 6 is equal to the door gap Sf. Then, the next door support 10 is positioned under the opposite end portion of the door slab 2 hung on the door frame 4, and the process is repeated, as shown in FIG. 5. Using the cable ties 20 and the locking washers 22, the door supports 10 are set in the folded state at an orientation where the dimension Sf is acquired by the bottom edge $3_B$ of the door slab 2 resting on the support edges 26 (i.e., in the support slots 24) of the door supports 10. Subsequently, the door supports 10 are removed from under the door slab 2.

The door support 10 acquires (determines or captures) the door gap Sf (i.e., the distance from the bottom edge $3_B$ of the door slab 2 from the floor 6). The door support 10 is capable of capturing any door gap Sf between about ⅜" to 1½", which is sufficient for most installations. Thus, the door support 10 is adjustable to accommodate door assemblies with various door gaps Sf. Additionally, the door support 10 serves as a 'third hand' for the installer.

During the installation of the replacement door slab, first, the two assembled door supports 10 in the folded states with captured door gap Sf from the previous door slab are placed on the floor 6 in line relative to one another and ready to support the replacement door slab, as shown in FIG. 2. Then, the replacement door slab is placed upright to the door supports 10, thus positioning the replacement door slab at the same distance Sf from the floor 6 as the previous (old) door slab to facilitate installation of the replacement door slab to the door frame 4. When the installation of new door hinges is completed, the door supports 10 are removed from under the replacement door slab.

Figure 6:
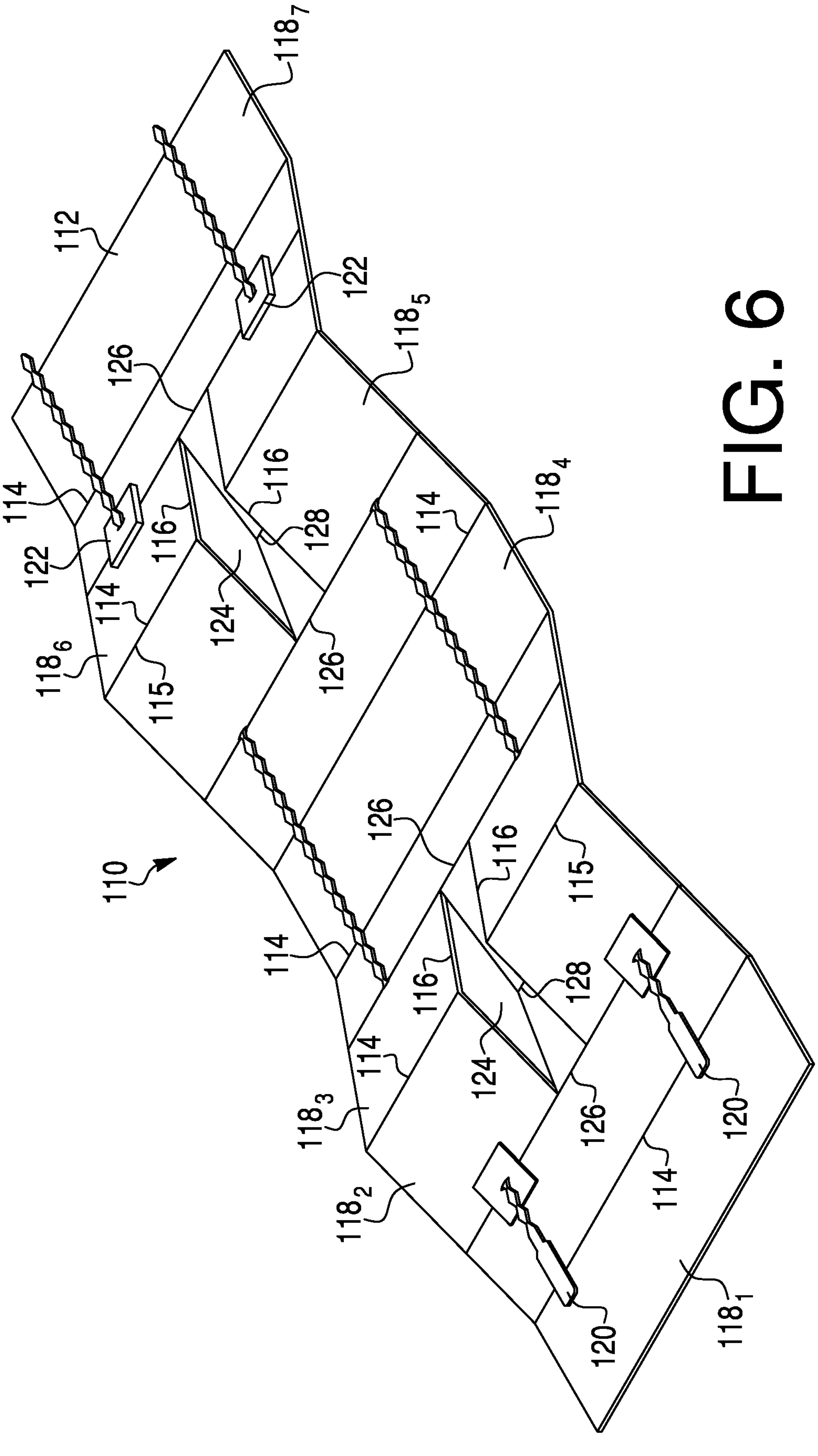
FIG. 6 is a perspective view of an adjustable door support according to a second exemplary embodiment of the present invention in a folded state.
Figure 7:
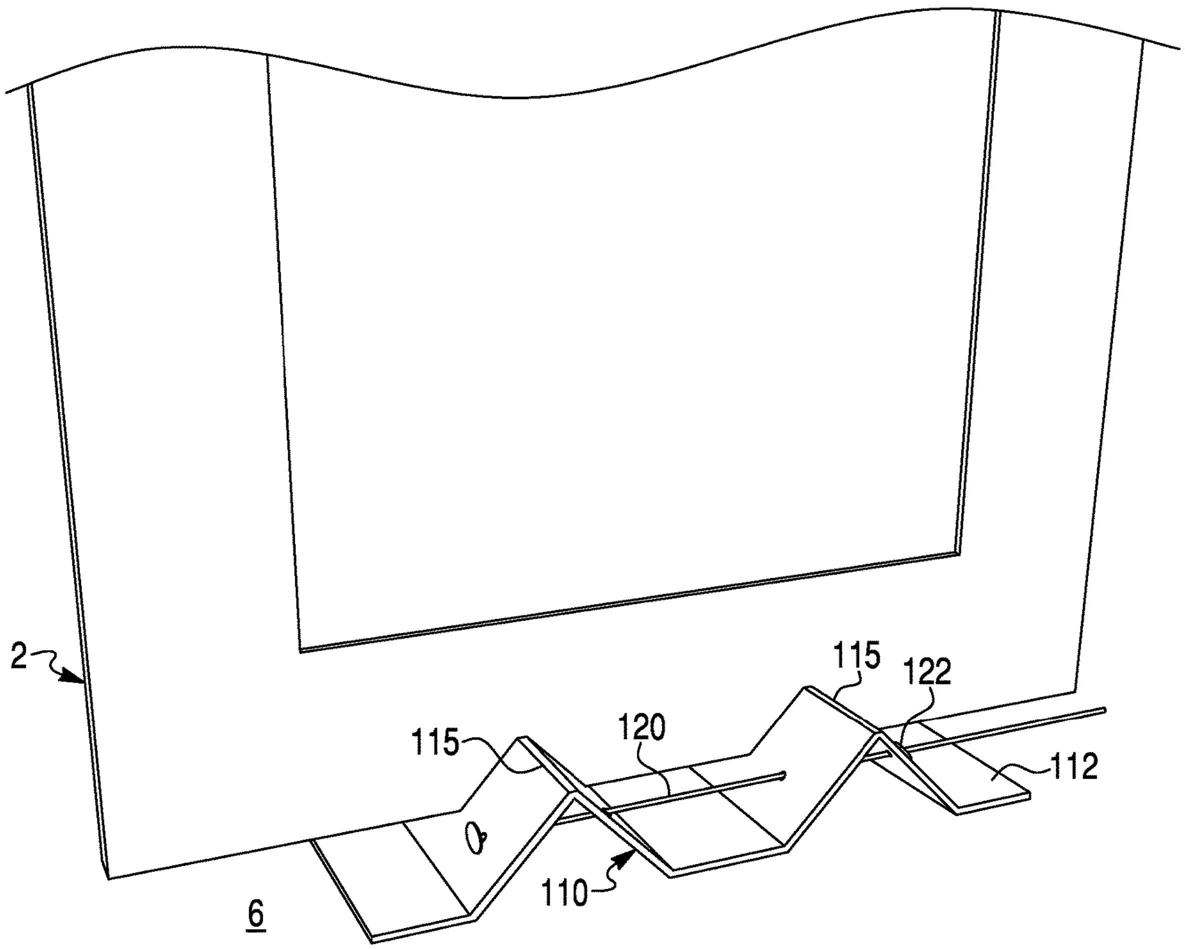
FIG. 7 is a perspective view of the adjustable door support according to the second exemplary embodiment in the assembled state placed on the floor and supporting the door slab.

Various modifications, changes, and alterations may be practiced with the above-described embodiment, including but not limited to the additional embodiments shown in FIGS. 6-7. In the interest of brevity, reference characters in FIGS. 6-7 that are discussed above in connection with the first exemplary embodiment of in FIGS. 1-5 are not further elaborated upon below, except to the extent necessary or useful to explain the additional embodiments of FIGS. 6-7. Modified components and parts are indicated by the addition of a hundred digits to the reference numerals of the components or parts.

FIGS. 6 and 7 depict an adjustable door support 110 according to a second exemplary embodiment of the present invention. The adjustable door support 110 is configured to acquire a distance (or door gap) Sf between a bottom edge $3_B$ of a door slab 2 (such as an existing door slab) mounted to a door frame 4 and a floor 6, as shown in FIG. 4, and to support the door slab 2 (such as a replacement door slab), as shown in FIG. 7, at the same distance Sf from the floor 6 as the existing door slab to facilitate installation of the replacement door slab to the door frame 4.

The adjustable door support 110 of FIGS. 6 and 7 corresponds substantially to the adjustable door support 10 of FIGS. 1-5, and represents two door supports 10 of the first exemplary embodiment integrated into a single unitary part. Specifically, the adjustable door support 110 is made of a flat rectangular sheet 112 of corrugated cardboard having a plurality of (such as six, as shown in FIG. 6) transverse, parallel pre-scored lines 114 extending across the entire width of the sheet 112. Two pairs of longitudinal parallel cut lines 116 extend across a portion of a length of the sheet 112. The distance between the longitudinal parallel cut lines 116 in the transverse direction is slightly larger than a thickness of the door slab 2. It will be appreciated that the door support 110 may be made of any appropriate material, such as corrugated plastic.

As best shown in FIG. 6, the six transverse pre-scored lines 114 divide the flat rectangular sheet 112 into seven rectangular sections: two outer rectangular sections $118_1$ and $118_4$, and two pairs of inner rectangular sections $118_2$, $118_3$ and $118_5$, $118_6$ separated by a central rectangular section $118_4$. Moreover, each of the inner rectangular sections $118_2$, $118_3$ and $118_5$, $118_6$ has two holes. The door support 110 further includes two zip ties 120, each extending through one of the holes in each of the two pairs of inner rectangular sections $118_2$, $118_3$ and $118_5$, $118_6$. Once each of the zip ties 120 is positioned completely through the associated and aligned, locking washers 122 are passed over free distal ends of the zip ties 120 to lock the zip ties 120 in place.

In operation, the first step is removing the flat rectangular sheet 112 of the door support 110 from the outer box of the door slab 2. The installer carefully removes sheet 112 by tearing along the perforations. Next, the flat rectangular sheet 112 is pre-folded (or pre-deformed) along the transverse pre-scored lines 114 according to the included instructions to resemble a "W" shaped structure. The flat rectangular sheet 112 is pre-folded along the transverse pre-scored lines 114, so that each pair of the inner rectangular sections $118_2$, $118_3$ and $118_5$, $118_6$ is folded relative to one another and form two top ridges 115. The cut lines 116 extend in parallel through sheet 112 in portions $18_2$, $18_3$ and $18_5$, $18_6$. Next, portions of each of the top ridges 115 between the longitudinal cut lines 116 are pushed down from the top ridges 115 so as to form two support slots 124 each defined by the inner rectangular sections $118_2$, $118_3$, two longitudinally opposite door support edges 126 and a support ridge 128.

Then, the installer slides the pre-folded door support 110 under the door slab 2 so that the bottom edge $3_B$ of the door slab 2 is disposed in the support slots 124 of the door support 110. After that, the support edges 126 of the door support 110 are raised to touch the bottom edge $3_B$ of the door slab 2 and the support ridge 128 is lowered to touch the floor 6 by tightening (or pulling on) the zip ties 120 with the locking washers 122 that lock the entire door support 110 and provide strength. In other words, once the door support 110 reaches the height of the door gap Sf, the door support 110 is locked into shape and place by pulling on the zip ties 120 while using the locking washers 122 to lock the shape of the door support 110, as shown in FIG. 7.

Therefore, the door support of the present invention is provided to acquire a door gap of the existing door and to support the replacement door at the same height as the existing door. In other words, the door support of the present invention considerably simplifies door installation procedure.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An adjustable door support for acquiring a door gap and for supporting the door slab at a height off a floor equal to the door gap, the door gap defined as a distance between a bottom edge of a door slab pivotally mounted to a door frame through door hinges and the floor, the adjustable door support comprising:

a bendable sheet including two outer sections and two inner sections, the two inner sections disposed at an oblique angle relative to one another and form a support slot for receiving a portion of the door slab therein, the support slot defined by the two inner sections and having two opposite door support edges configured to engage the door slab; and two tie devices, each of the tie devices including a cable tie threaded through the inner sections of the bendable sheet and an adjustable locking washer attached to the cable tie by sliding over the cable ties;

the adjustable locking washers slidable over the cable ties in one direction only and lockable on the cable ties to adjust a distance between the support edges of the adjustable door support and the floor.

2. A method of using an adjustable door support for acquiring a door gap and for supporting a door slab at a height off a floor equal to the door gap, the door gap defined as a distance between a bottom edge of the door slab pivotally mounted to a door frame through door hinges and the floor, the method comprising the steps of:

providing a rectangular sheet of bendable material including two outer sections and two inner sections, the rectangular sheet having transverse pre-scored lines extending across the entire width of the sheet in a transverse direction to separate the outer sections and the two inner sections, and two longitudinal parallel cut lines extend across a portion of the length of the two inner sections in a longitudinal direction, the distance between the longitudinal parallel cut lines in the transverse direction being equal or larger than a thickness of the door slab;

pre-shaping the rectangular sheet along the transverse pre-scored lines to form an inverted "V" shaped structure such that the two inner sections are disposed relative to one another at an oblique angle and form a support slot for receiving a portion of the door slab therein, the support slot defined by the two inner sections and having two opposite door support edges configured to engage the door slab;

providing two tie devices, each of the tie devices including a cable tie and an adjustable locking washer;

passing the cable tie of each of the tie devices through both of the two inner sections of the pre-shaped rectangular sheet;

attaching the locking washer of each of the tie devices to a free distal end of the cable tie of one of the tie devices by sliding over the cable tie to form a pre-shaped door support;

positioning the pre-shaped door support under the door slab hung on the door frame so that the two outer sections are laying on a floor and a portion of the bottom edge of the door slab is disposed in the support slot of the pre-shaped door support;

acquiring the door gap by pulling the cable tie so that the support edges of the door support are raised to engage the bottom edge of the door slab;

locking the door support into shape by pulling on the cable ties and using the locking washers to lock the door support once the support edges of the door support reach the height of the door gap.

3. The method as defined in claim 2, further comprising the step of placing a replacement door slab in the door support channel of the door mounting support, which is adjusted so that the support edges thereof are spaced from the floor by a distance equal to the door gap.

* * * * *